Patented June 22, 1948

2,443,889

UNITED STATES PATENT OFFICE 2,443,889

ADHESIVE OF WATER REMOISTENABLE TYPE FROM LIGNIN SULFONIC ACID AND POLYVINYL ALCOHOL

Donald S. Bruce and Howard L. Heise, Troy, Ohio, assignors to Gummed Products Company, Troy, Ohio, a corporation of Ohio No Drawing. Application August 20, 1946,
Serial No. 691,878

6 Claims. (Cl. 260—17.5)

This application is a continuation in part of our application on Adhesives, Serial No. 572,972, filed January 15, 1945, now abandoned.

Our invention relates to adhesives including adhesives of the water remoistenable type adapted to be applied as a film or coating to sheet material—paper—cloth—tape, etc.

In the art the polyvinyl alcohols ($CH_2CHOH$) made by hydrolyzing polyvinyl acetate, have been suggested for blending with other adhesives such as latex, starch, casein and soya bean protein.

The use of plasticizers in adhesive mixtures, such as glycerin, glycol, etc., is considered standard practice.

In the art it has also been suggested that concentrated waste sulphite liquors possess adhesive properties. As far as we are advised however, this use of concentrated waste sulphite liquors has been restricted to adhesives used as binders for road making, linoleum cement manufacture and like-purposes and no actual use as adhesives, particularly remoistenable adhesives, has ever been suggested. This is because while the powdered dried waste sulphite liquors and the waste liquor concentrates make suitable binding agents, such products do not become sufficiently tacky and sticky with the application of moisture thereto. When applied as a coating to sheet material, dried and remoistened, the surface posesses insufficient tack or bond strength for practical use. The components of waste sulphite liquor vary to some extent, and are complex in nature. Due to this complexity the chemical nature of this product is known only in a general way.

We have found that mixtures of polyvinyl alcohol and concentrated sulphite liquor applied to paper as a film and dried, will on being remoistened, develop remarkable and unusual adhesive properties surpassing the properties of either the polyvinyl alcohols by themselves, or the sulphite liquor concentrates.

As far as we are advised, remoistenable adhesives for use with paper and cloth, sheet or web material as required for the manufacture of binding tape, stickers, and the like, have invariably been made with animal glue with or without admixture with vegetable glue.

As far as we are advised therefore, it is broadly new to make an adhesive having satisfactory initial and permanent tack without a high percentage of animal glue or a blending thereof.

In view of the comparative cheapness of powdered or concentrated waste sulphite liquors and the comparatively high cost of animal glue, our invention makes possible the production of a better adhesive having at least equivalent quick tack and superior permanent adhesion than animal glue mixtures at substantially lower cost. This represents a saving in the industry of considerable commercial importance.

The objective of our invention may thus be broadly stated to be the manufacture of an adhesive including a remoistenable type, substantially from waste products, which, when applied as a film or coating to fibrous sheet or web material (paper, cloth and the like), will have a better and more lasting tack than animal glue or animal glue mixtures and may be produced at a substantially lower cost. Also it is our objective to make a remoistenable type of adhesive which upon long exposure does not hydrolyze and become "dead," as does animal glue.

As an example of the use of our invention, we take 100 parts of polyvinyl alcohol (to be specific the type of P. V. A. sold by a large chemical manufacturer which is called "high viscosity." A 4% aqueous solution at 20° C. has an approximate viscosity of 50 centipoises. We dry mix the 100 parts P. V. A. with 2100 parts comprising dry powdered waste sulphite liquor comprising lignosulphonic acid) in a suitable dry blender. The intimately mixed dry powders are then mixed with an equal weight of water, mixing temperature being maintained at between 160° and 180° F. On the dry basis of the mixture of P. V. A. and the waste sulphite liquor concentrate, 5% of glycol is added.

As a further example of our invention we may use the following composition:

(1)

| | Parts |
|---|---|
| Polyvinyl alcohol | 25 |
| Waste sulphite liquor concentrated to a dry powder | 300 |
| Plasticizer | 15 |
| Water | 325 |

The polyvinyl alcohol used may be selected from a wider range of commercially available products than is specifically designated in our first example, and can be used singly or as mixtures of two or more grades depending on the requirements of the finished adhesive. For example we may use a "low viscosity" grade, a "medium viscosity" grade, a "high viscosity" grade, or a mixture of two or all of the grades. To further identify the aforementioned grades they have the following approximate viscosities in centipoises of a 4% aqueous solution at 20° C.;

"low viscosity"—5 centipoises, "medium viscosity"—20 centipoises and "high viscosity"—50 centipoises.

In order to test the effectiveness of the adhesive properties of the mixture of our first example, we coated sheets of paper with the mixture noted. We also coated other sheets of the same paper with straight waste liquor concentrate solution, with straight P. V. A. solution and with pure animal glue. After the coated films had dried we moistened the surface of each sheet (using a minimum of water) and applied the moistened surfaces to corrugated board of the type used for shipping containers. The sheets were then pulled apart. The results of this test were as follows: The sheet coated with waste sulphite liquor concentrate solution did not stick at all. The sheets coated with P. V. A. solution stuck partly as did the animal glue treated sheet. But the sheet treated with our new mixture (5% P. V. A.—95% waste sulphite liquor concentrate) removed the surfaces of the board throughout the area to which the mixture had been applied—neatly and positively.

The waste sulphite liquor may be used as a dry powder as indicated by our examples or it may be used as a concentrate covering a range of solids content. When a concentrate is used, it is necessary to reduce water in our composition example in order to maintain the adhesive at a satisfactory working consistency. For sake of convenience we may also use a mixture of dry powdered waste sulphite liquor and concentrate, as for example:

(2)

| | Parts |
|---|---|
| Polyvinyl alcohol | 25 |
| Waste sulphite liquor concentrated to a dry powder | 150 |
| Concentrate (50% solids) | 300 |
| Plasticizer | 15 |
| Water | 175 |

Although glycerin is the preferred plasticizer for our composition, the glycols such as ethylene or propylene have been found satisfactory. Also to a more limited degree the sulphonated oils such as sulphonated caster and "Sorbitol" (a higher polyhydric alcohol than glycerin) have been found useful as plasticizers.

When a waste sulphite liquor concentrate or mixture of concentrate and dry powder is used, the mixing procedure is modified as follows: The P. V. A. and sufficient cold water for solution are placed in a suitable wet mixer, live steam introduced to effect solution of the P. V. A., then the other ingredients added and agitation continued until a thoroughly blended stock results. Temperature during mixing is maintained at between about 180° and 200° F.

By making mixtures of different proportions of P. V. A. of the type used in our first example, and waste sulphite liquor concentrate, we further arrived at the critical limits of the mixtures with this particular high viscosity grade, beyond which the surprising properties began to disappear. Thus, we found that below 3% of P. V. A. 97% waste sulphite liquor concentrate, the quick tack began to disappear and that above 10% of P. V. A. 90% waste sulphite liquor concentrate the properties of quick tack were not as pronounced. It appeared to be critical therefore with the high viscosity grade, that proportions of from 3 to 10% P. V. A. be used with from 97% to 90% waste sulphite liquor concentrate, the dry mixture having up to 10% of a plasticizer such as glycerine or the glycols.

In our use of the terms "concentrate of waste sulphate liquor consisting essentially of ligno sulphonic acid" to define equivalents of the commercial product waste sulphite liquor concentrate which is a dry powdered form of the concentrate resulting from dehydrating, or otherwise treating (as will be hereafter explained), the waste sulphite liquor resulting from the practice of the sulphite process in which the lignin and non-cellulose materials are removed from the wood pulp and chemically compounded with sulfur as distinguished from the liquor resulting from the practice of the sulphate process in which the "black liquor" contains the lignins in a form in which they are readily precipitated by acidification or neutralization. Waste sulphite liquor concenerate, however, is not commercially pure ligno sulphonic acid and may contain a complex of other unidentified salts.

Our P. V. A. sulphite liquor mixture has no tendency toward putrification in aqueous solution. This is a decided advantage over glue which putrifies very quickly under similar conditions unless sizable quantities of preservatives are included in the mixture. This advantage is not of such significance when the adhesive is used on a tape, which is commercially handled under dry conditions, but is a more important advantage in the instance of prepared adhesives.

Although our mixture has a distinctive odor it is not at all unpleasant when compared to the odor of commercial glues.

In the examples given, we explained about the blending of dry powdered P. V. A. and waste sulphite liquor concentrate. We consider this method of mixing important because it permits a means of effecting ready solution of the P. V. A. which by itself is quite difficult to dissolve. This blending of the readily soluble material waste sulphite liquor concentrate with the material not readily soluble; P. V. A. as a preliminary to effecting an aqueous mixture or solution therewith, is a procedure having possibilities of wider application than are here enumerated.

Waste sulphite liquor although complex in nature, contains two known major constituents; i. e., ligno sulphonic acid and reducing sugar. Ligno sulphonic acid is the product resulting from the sulphite process of lignin removal from pulp wood. Reducing sugar results from the carbohydrate present in pulp wood, which during the sulphite cooking process is converted to sugar and removed from the pulp in solution with the ligno sulphonic acid. It is our understanding that on a dry basis reducing sugar runs from 20–35% in waste sulphite liquor depending on the type wood being pulped as well as the season of the year the wood was cut.

We have found that both of the major constituents in waste sulphite liquor are valuable contributors to the value of our adhesive. However because of a pronounced hygroscopic tendency (ability to take in moisture from the atmosphere) of the reducing sugar our adhesive possesses a certain disadvantage unless means are provided to minimize the hygroscopic tendency. The disadvantage referred to is most apparent when our adhesive is used as a water remoistenable gumming on paper or fabric as in gummed tape. In this application unprotected rolls of tape when subjected to high relative humidity will be rendered useless by the individual plies of the roll sticking together or "blocking," the common term applied to this condition.

We have found two basic methods by which "blocking" can be minimized. First by reducing the sugar content of the waste sulphite liquor and second, through the use of additives which serve to inhibit softening of the adhesive due to the hygroscopic nature of the sugar present.

One method of reducing sugar in waste sulphite liquor is by fermentation. In this "desugarizing" method yeast consumes the sugar forming ethyl alcohol and $CO_2$ as by-products. Such process is disclosed in the expired patent to Heijkenskjold No. 1,680,043 of August 7, 1928. By controlled fermentation it is possible to reduce or entirely eliminate sugar and produce a modified waste sulphite liquor which in its dried form possesses reduced or no tendency to absorb atmospheric moisture. We therefore consider it within the scope of our invention to use waste sulphite liquor partially or completely stripped of sugar by fermentation, selection of sugar content being made based on the requirement of the finished adhesive. We also consider it within the scope of our invention to use waste sulphite liquor which has been relieved of sugar wholly or in part, by known processes other than fermentation.

In the class of additives we have found that certain non-hygroscopic inorganic salts aid materially in reducing the hygroscopic tendency of our adhesive. Salts which we have found suitable cover a range of chemical activity as for instance an acid salt such as aluminum sulphate through an alkaline salt such as tri-sodium phosphate. In fact it is our belief that any non-hygroscopic or preferably efflorescent salt compatible with our base mixture will serve to reduce the hygroscopic tendency of the finished adhesive. An example of our preferred use of inorganic salt addition follows:

(3)

| | Parts |
|---|---|
| Polyvinyl alcohol | 25 |
| Sulphite waste liquor concentrated to a dry powder | 300 |
| Plasticizer | 15 |
| Disodium phosphate | 50 |
| Water | 375 |

Mixing remains unchanged except that salt is added as a 50% solution at the conclusion of the mixing period.

Presumably the effectiveness of inorganic salt additions is that they serve as soluble fillers and thus cut down the overall capacity of the adhesive to absorb atmospheric moisture. We have used inorganic but non-soluble fillers such as partially colloidal clay and found that this class of filler also is effective in reducing the hygroscopic tendency of the adhesive. We have further found that clay in amounts up to 300 parts in our basic formulation can be used. Selection of the amount of clay is determined by the use requirement of the adhesive being formulated. We therefore consider that the use of inorganic non-soluble fillers such as clay, zinc oxide, titanium oxide and similar pigments fall within the scope of our invention.

We have used the salts of ligno sulphonic acid as produced in accordance with the so-called "Howard" process, and have found that these salts serve to decrease "blocking" tendency. These salts of ligno sulphonic acid are dry, free flowing powders, which are soluble in water, compatible with our adhesive, but possess no tendency to absorb atmospheric moisture. Thus we may use calcium, magnesium, sodium or ammonium ligno sulphonate in amounts indicated by the following example:

(4)

| | Parts |
|---|---|
| Polyvinyl alcohol | 25 |
| Waste sulphite liquor concentrated to a dry powder | 300 |
| Plasticizer | 15 |
| Disodium phosphate | 50 |
| Magnesium ligno sulphonate | 10 |
| Water | 385 |

Mixing is accomplished as described previously, the salt of ligno sulphonic acid being added along with the waste sulphite liquor concentrate. Preferably the additives of either class are employed in amount not less than 5% by weight of the adhesive calculated on a dry basis.

In the preparation of our adhesive we have found that the addition of a small portion of wetting agent hastens the time required to wet the dry powdered ingredients and therefore shortens the time required for mixing. Also in the case of water remoistenable adhesive applied to cloth or paper as in the case of gummed tape, the inclusion of wetting agent assists in the subsequent moistening of the tape in a manner which permits a more uniform application of moistening water. Our preferred use of wetting agent is in the order of 1 part in the examples noted of a type listed in the publication entitled "Du Pont Products Index" for June 1946, page 186, as MP-189.

Thus we consider within the scope of our process the basic composition as set forth in the first two examples as made from unaltered waste sulphite liquor, and also waste sulphite liquor from which all or a portion of the sugar has been removed, and we may also use inorganic, soluble non-hygroscopic salts such as disodium phosphate, inorganic, non-soluble fillers such as clay and salts of ligno sulphonic acid such as magnesium ligno sulphonate. We use the foregoing either with or without wetting agent as requirements dictate.

It is understood that the examples given are for purposes of explanation, not restriction.

Used as a water remoistenable adhesive on cloth or paper as in gummed tape we have found that the outstanding advantage of our composition is its superior permanent adhesion. Compared to conventional gummed tape made from animal or vegetable glue or a mixture of these two adhesives, our investigations have shown that under identical conditions our adhesive develops a permanent bond with the contacting surface of the order of twice that possible with the aforementioned conventional adhesives. This unusual feature is particularly true where a minimum of moistening water is applied and where the time interval between moistening and application is abnormally long. The reason for permanent adhesion superiority is probably traceable to the fact that our adhesive is more readily soluble than the conventional types and therefore more thoroughly wets and penetrates the contacting surface, creating, when dry, a more perfect union between tape and contacting surface.

Along with the superior permanent adhesion noted above our adhesive when used as a water remoistenable type exhibits quick tack essentially equal to conventional types of animal and vegetable adhesives. This means that we have produced a thoroughly practical tape adhesive for normal packaging operation plus the added advantage of superior permanent adhesion and increased foolproofness due to the longer time of application interval provided by our more soluble composition.

Although we have cited preferred proportions of waste sulphite liquor and P. V. A. we wish to point out that we have employed a wide range of blends of these two major ingredients. Thus using 300 parts dry powdered waste sulphite liquor and 300 parts water as a basis we used P. V. A. in amounts ranging from 1 to 100 parts. Generally speaking we found that for water remoistenable tape application the optimum quantity of P. V. A. is of the order of 25 parts. However, for the extremely varied types of adhesive application other than gummed tape where application requirements dictate the character of the adhesive, we believe that the entire range of waste sulphite liquor—P. V. A. proportions noted may find application. As an example, in an application where the bond strength requirement is low and where low cost is essential, we have compounded an adhesive containing a very low proportion of P. V. A. Conversely when conditions demand high bond strength and cost is not a consideration, we formulate a composition containing a relatively high proportion of relatively high cost P. V. A.

In the foregoing we have in many instances stressed the application of our new adhesive to cloth or paper as in gummed tape. However, although gummed tape is an obvious and likely use for our composition, there is no intent to restrict its use to this application. There are many opportunities for formula modification to make our new adhesive particularly adapted for use in the many and varied applications for water soluble adhesives. Thus we consider it within the scope of our invention to use our adhesive in applications other than gummed tape as for instance laminating cloth and paper and paper products, pasting flaps in corrugated and solid board shipping containers, pasting labels, etc.

Having thus described our invention, what we claim as new and desire to secure by Letters Patent is:

1. A new adhesive comprising on a dry basis at least 75 percent of a concentrate consisting essentially of lignosulphonic acid made from waste sulphite liquors, at least three percent of polyvinyl alcohol, and at least five percent of disodium phosphate.

2. An adhesive the active adhesive agent therein consisting of at least three percent of polyvinyl alcohol and at least 75 percent of a desugarized concentrate of waste sulphite liquor containing lignosulphonic acid, calculated on a dry basis.

3. A new adhesive comprising on a dry basis at least 75 percent of a concentrate consisting essentially of lignosulphonic acid made from waste sulphite liquors treated to reduce the sugar content thereof, at least three percent of polyvinyl alcohol, and at least five percent of disodium phosphate.

4. An adhesive, the active adhesive agent therein consisting of at least 3 percent of polyvinyl alcohol and at least 75 percent of a concentrate of waste sulphite liquor containing lignosulphonic acid, proportions being on a dry basis.

5. An adhesive, the active adhesive agent therein consisting of from 3 percent to 10 percent of polyvinyl alcohol and from 97 percent to 90 percent of a concentrate of waste sulphite liquor containing lignosulphonic acid, proportions being on a dry basis.

6. An adhesive as claimed in claim 4, containing at least 5% of a blocking inhibitor consisting of an inorganic, water soluble, non-hygroscopic salt, proportions being on a dry basis.

DONALD S. BRUCE.
HOWARD L. HEISE.

REFERENCES CITED

The following references are of record in the file of this patent:

UNITED STATES PATENTS

| Number | Name | Date |
|---|---|---|
| 2,242,601 | Wallace | May 20, 1941 |
| 2,332,896 | D'Alelio | Oct. 26, 1943 |